Patented June 17, 1947

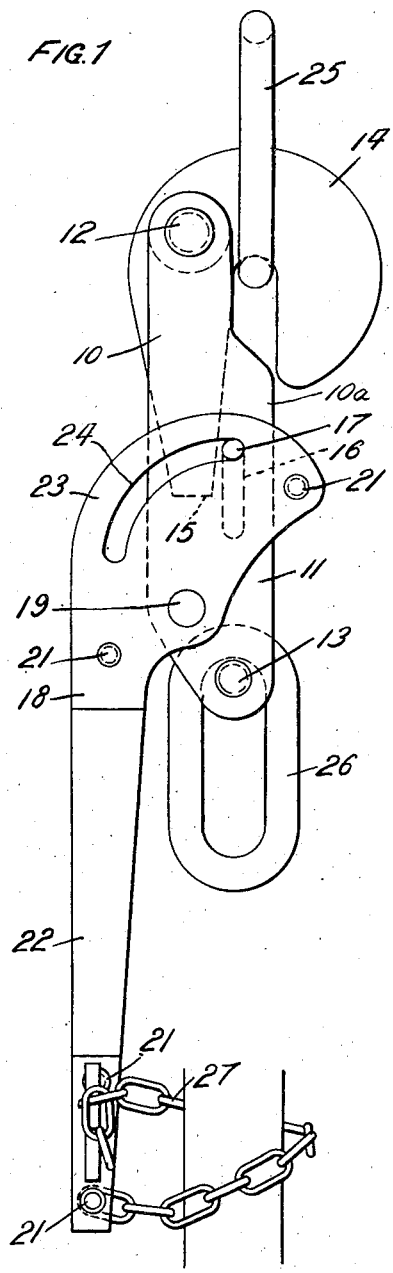
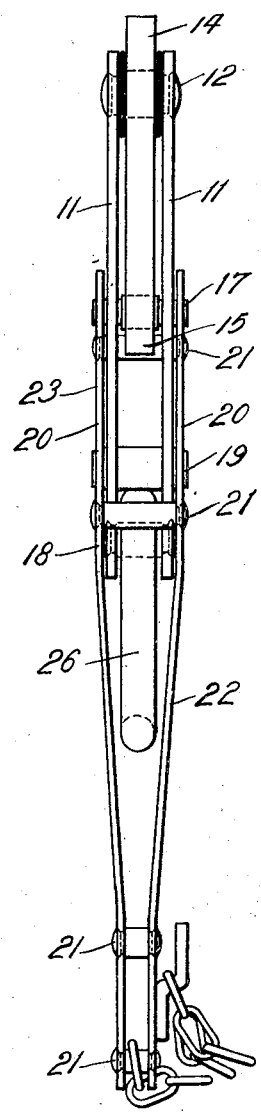

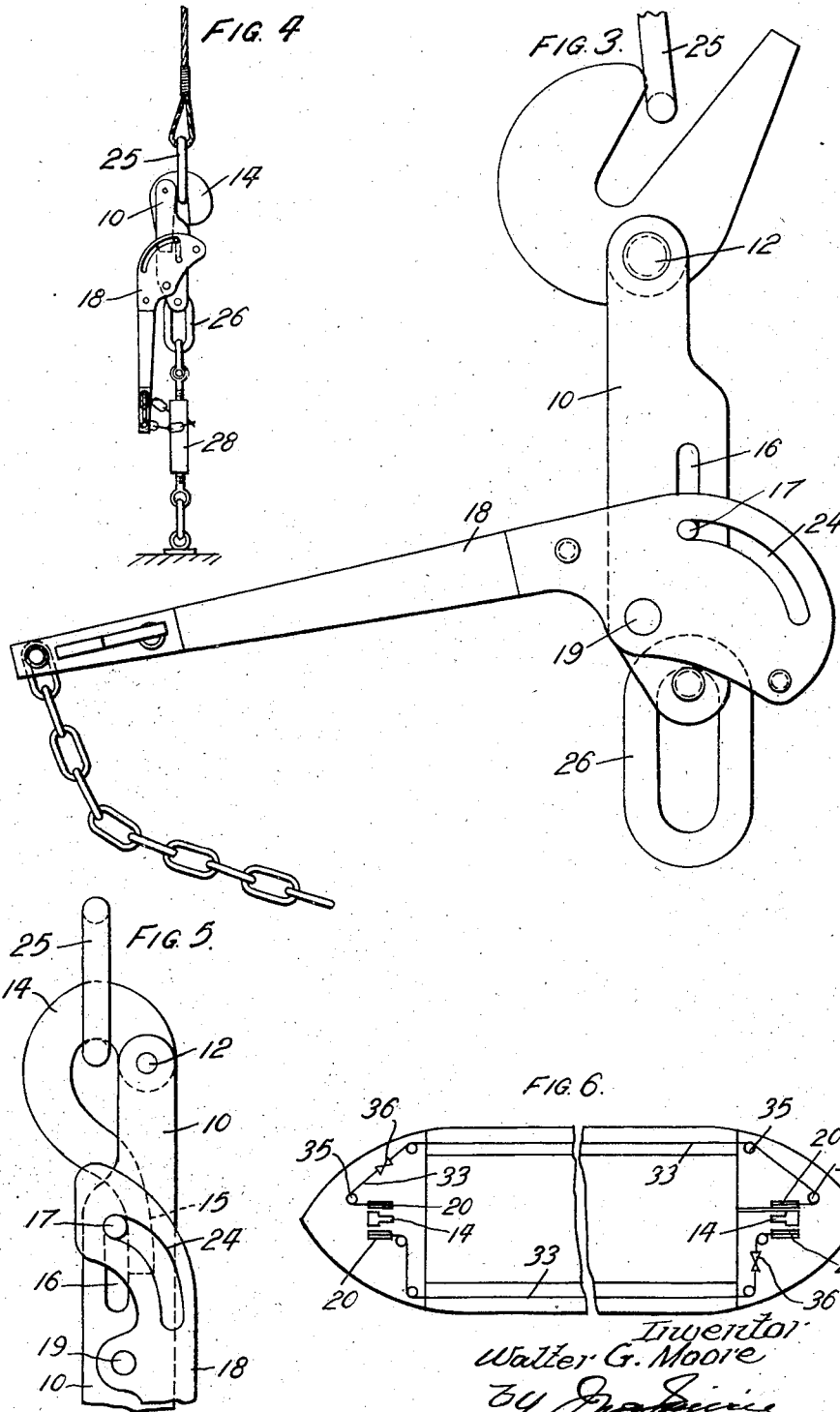

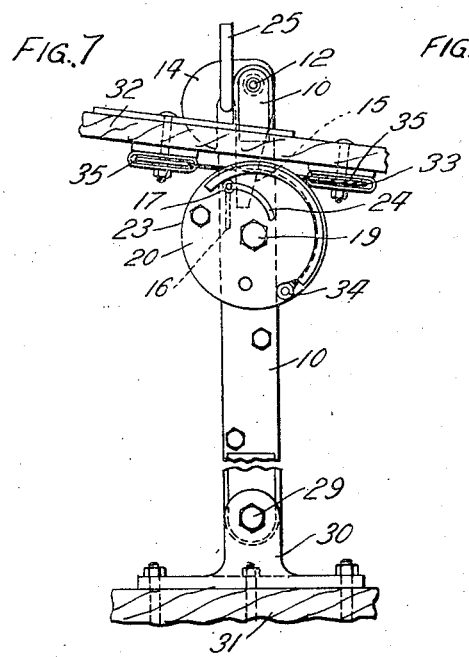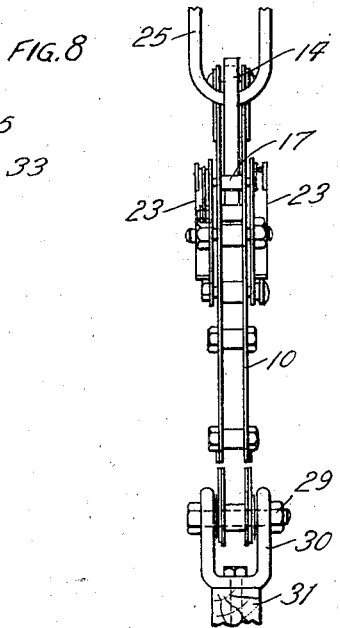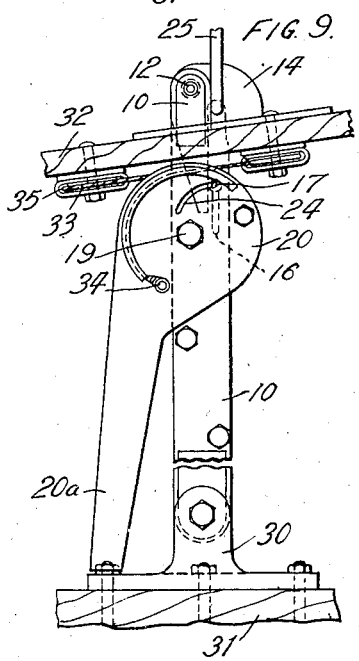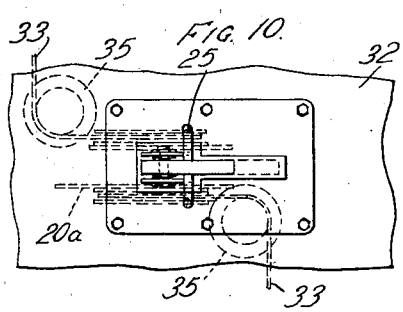

2,422,363

UNITED STATES PATENT OFFICE 2,422,363

QUICK RELEASE HOOK

Walter Gordon Moore, Liverpool, England

Application August 21, 1944, Serial No. 550,404
In Great Britain August 18, 1943

2 Claims. (Cl. 9—45)

This invention is for improvements in or relative to quick release or slip hooks such as are used, for example, in launching gear for ship's lifeboats or rafts, couplings for railway and other vehicles and the like. The invention is also concerned with improvements in launching gear for ship's lifeboats.

An object of the invention is to provide a quick-release hook of such a construction that very little effort is required to effect the releasing operation even although the load on the link or coupling at the time of release may be considerable.

A further object of the invention is to provide a quick release hook which, whilst it can easily and quickly be released, can be relied upon to take a substantial load without risk of failure.

A still further object of the invention is to provide the combination with a pair of quick release hooks, secured one at each end of a lifeboat, of means for releasing said hooks simultaneously from a common operating station so as to avoid the risk of one end of the boat being released before the other.

A still further object of the invention is to provide a quick release hook, particularly suitable for use in a boat launching gear, which is of simple and durable construction and is reliable in operation even in "icing" conditions.

The invention will be further described, by way of example, with reference to the accompanying drawings, whereon:

Figure 1 is a front elevation of an embodiment of the invention suitable for use, as a quick release hook, in connection with a lifeboat launching gear or the like, or as a railway or other vehicle coupling.

Figure 2 is a side elevation of the release hook shown in Figure 1,

Figure 3 is a front elevation similar to Figure 1 but showing the position of the parts after the hook has been released, Figure 4 is a side elevation showing a convenient manner in which the release hook shown in Figures 1, 2 and 3 can be attached to the deck of a ship for use, for example, as a quick release for rafts supported on inclined slide-ways at the side of the ship.

Figure 5 is a fragmentary side elevation of a modification of the embodiment of the invention shown in Figures 1 to 4, Figure 6 is a diagrammatic plan view illustrating an application of the invention to the launching gear of a ship's lifeboat.

Figure 7 is a detail front elevation of the release hook provided at the fore end of the boat shown in Figure 6, Figure 8 is a side elevation of Figure 7, Figure 9 is a detail front elevation of the release hook provided at the aft end of the boat shown in Figure 6, and Figure 10 is a plan view of Figure 9.

The quick release hook shown in Figures 1, 2, 3 and 4 comprises a link 10 formed by a pair of cheek plates 11 riveted together in spaced apart relationship as indicated at 12 and 13. A slip-hook 14 is pivoted to one end of the link 10 on the rivet 12. The slip-hook has an abutment in the form of a tail 15 adapted to slide between the cheek plates 11. The link 10 has a closed slot 16, formed in the cheek plates 11, extending along its axis, and a roller stop or keeper 17 extends through this slot and is adapted to roll therein. A hand lever 18 for releasing the slip-hook is pivoted to the link 10 at 19. This lever comprises a pair of cheek plates 20 arranged one on each side of the link 10 and riveted together in spaced apart relationship as indicated at 21. One arm of the lever 18, a long arm 22, constitutes a handle proper and the other, a short arm 23, has a curved cam-slot 24 through which the ends of the abovementioned roller stop 17 pass. The shape of the slot 24 in the hand lever, and the position thereof in relation to the pivot 19, are such that when the lever is moved about its pivot the roller stop 17 is rolled from one end of the slot 16 to the other end. The ends of the roller stop 17 which pass through the cheek plates of the link 10 and the hand lever 18 are of reduced diameter compared with the centre part of the said stop which lies between the cheeks of the link and is adapted to be engaged by the tail of the hook. This enlarged centre part of the stop retains it in the link. The link 10 has a shoulder 10a which serves to close the mouth of the hook when the latter is in its operative position as shown in Figure 1.

In use one of the members to be coupled together is attached by a shackle or the like 25 to the slip-hook and the other member is attached to the link by a shackle or the like 26 on the rivet 13. The tail 15 of the hook lies between the cheek plates 11 of the link and the handle is in a position in which it constrains the roller stop to take up a position, in its slot, in which it engages the tail of the slip-hook as shown in Figure 1, and prevents movement thereof in the release direction. The pull on the shackle 25 acts close to the pivot 12 of the hook and there is no substantial force tending to turn the hook and apply pressure to the roller stop, the load being taken substantially in the direction of the length of the link. To release the coupling it is only necessary, with the large amount of leverage provided, to apply a small effort to the hand lever 22 so that the freely movable roller stop 17 is moved to the opposite end of the slot 16 in the link, whereupon the tail of the hook is released and the hook swings freely so as to cast off the shackle attached to it as shown in Figure 3.

It will be seen that in effect, with the coupling according to the present invention, whilst the load taken by the coupling acts substantially along the length of the coupling the means (e. g. the roller stop) preventing release of the loaded coupling acts in a direction which may be substantially normal to the direction of the load so that release of the coupling does not have to be effected against the action of the load or at least only to a small extent.

In the operative condition of the coupling the hand lever may be lashed or chained to any convenient member as indicated at 27 in Figure 1, to prevent unauthorised release of the coupling.

In the modification shown in Figure 5 the hook 14 is pivoted by its nose to the link 10 so that the hook is closed completely when the tail 15 is in engagement with the roller stop 17.

Where the hook has to be anchored to the deck of a boat or the like it is convenient to do this by means of an adjustable Warwick or bottle screw 28 as shown in Figure 4.

The coupling, according to the present invention, has many applications which include the coupling together of wagons, the support of ship's lifeboats from the fall ropes of the davits so that the boats can be cast off quickly, and the securing of cargo or life-saving rafts to a ship's deck. In the latter case the coupling would be secured between the end of the lashing attached to the raft and the deck of the ship so that the raft when required can be released quickly by the operation of the coupling.

A specific example of the application of a release hook, of the character above set forth, to the launching gear of a lifeboat is shown in Figures 6 to 10. The release hooks provided at the fore and aft ends of the boat, in the arrangement shown, are similar in construction to that described with reference to Figures 1, 2 and 3 and like reference numerals have been used to designate like parts. The slotted cheek plates 20 of the cam elements 23, however, are in the form of or comprise sheave-like members and the hook carriers or links 10 are anchored at 29 to brackets 30 attached to the keelson 31 of the boat. The hooks 14 and the upper ends of the links 10 project through apertures in the gang-planks 32. One of the cheek plates 20 of the aft release hook shown in Figure 9 is provided with a handle 20a for the simultaneous release of both hooks. For this purpose ropes 33 are anchored at 34 to the sheave-like cheek plates 20 of the cam element 23 of the fore end hook and are partially reeved therearound and led via sheaves 35 to the sheave-like cheek plates 20 of the aft hook cam element to which they are similarly connected. Screw devices 36 are provided for adjusting the tension of the ropes 33. Instead of or in addition to the handle 20a a common operating member for the two hooks may be located in some other part of the boat where it can be connected conveniently to one of the ropes 33. The links 25 are, of course, attached to the fall ropes of the davits.

The cam slot and the slot in the link may be shaped or inclined with respect to one another so that a gradual release of the load on the hook takes place (i. e. the final release movement may be speeded or retarded) or, if required, so that the load on the hook is eased or slackened prior to actual release.

The hook, according to the invention, is or can readily be made self-locking because the hook will fall back into position ready to be re-engaged by the roller-stop 17, and the latter will be returned to the locking position by the weight of the handle 22 moving the member 18 in the locking direction. In Figure 7 movement of the release member 20 is effected in both directions by providing the double rope and pulley shown in Figure 6. One rope may be dispensed with by providing the member 20 with a balance weight to return it to the locking position.

I claim:

1. The combination with a lifeboat of launching gear for the boat including at each end thereof a quick release hook comprising a hook carrier, a hook pivoted on said carrier, said hook having an abutment, a slot in said carrier, a stop movable in said slot into and out of engagement with said abutment of the hook and operative when engaging said abutment to hold the hook against movement in the release direction, a sheave journalled on the hook carrier and having a cam-slot embracing the stop for effecting movement thereof in the release direction, means securing each hook carrier to the boat, a common operating member for the sheaves of the respective quick release hooks and a rope reeved on said sheaves and connected thereto and to the common operating member for simultaneous release of the two hooks.

2. The combination with a lifeboat of launching gear for the boat including at each end thereof a quick release hook comprising a hook carrier, a hook pivoted on said carrier, said hook having an abutment, a slot in said carrier, a roller stop rollable in said slot into and out of engagement with said abutment of the hook and operative when engaging said abutment to hold the hook against movement in the release direction, a sheave journalled on the hook carrier and having a cam-slot embracing the roller stop for effecting rolling movement thereof in the release direction, means securing each hook carrier to the boat, a common operating member for the sheaves of the respective quick release hooks and a rope reeved on said sheaves and connected thereto and to the common operating member for simultaneous release of the two hooks.

WALTER GORDON MOORE.

REFERENCES CITED

The following references are of record in the file of this patent:

UNITED STATES PATENTS

| Number | Name | Date |
| --- | --- | --- |
| 2,245,270 | Goode | June 10, 1941 |
| 1,451,324 | Casamayor | Apr. 10, 1923 |
| 1,281,370 | Hills | Oct. 15, 1918 |
| 1,096,126 | Rantzow | May 12, 1914 |
| 845,477 | Oliver | Feb. 26, 1907 |
| 85,685 | Mortimer | Jan. 5, 1869 |
| 72,866 | Lanagan | Dec. 31, 1868 |